(12) United States Patent
Yukawa

(10) Patent No.: US 7,490,644 B2
(45) Date of Patent: *Feb. 17, 2009

(54) PNEUMATIC TIRE WITH NOISE DAMPER

(75) Inventor: Naoki Yukawa, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 309 days.

This patent is subject to a terminal disclaimer.

(21) Appl. No.: 11/392,881

(22) Filed: Mar. 30, 2006

(65) Prior Publication Data

US 2006/0272759 A1 Dec. 7, 2006

(30) Foreign Application Priority Data

Jun. 1, 2005 (JP) ............................ 2005-161732

(51) Int. Cl.
- *B60C 19/00* (2006.01)
- *B60C 5/00* (2006.01)
- *F16F 15/32* (2006.01)

(52) U.S. Cl. ................................. 152/154.1; 152/450

(58) Field of Classification Search .............. 152/154.1, 152/450

See application file for complete search history.

(56) References Cited

U.S. PATENT DOCUMENTS 2,193,734 A 3/1940 MacCracken
6,581,658 B2 * 6/2003 Nakajima et al. ........ 152/154.1
6,726,289 B2 4/2004 Yukawa et al.
7,182,114 B2 * 2/2007 Yukawa ..................... 152/450
2005/0155686 A1 * 7/2005 Yukawa et al. ............. 152/450

FOREIGN PATENT DOCUMENTS

EP 1 219 944 A2 7/2002
WO WO-03/103989 A1 * 12/2003

OTHER PUBLICATIONS

Webster's New World Dictionary of American English, Third College Edition, ed. Victoria Neufeldt and David Guralnik, Simon & Schuster, Inc., New York, 1988, p. 1509.*

* cited by examiner

*Primary Examiner*—Adrienne C Johnstone
(74) *Attorney, Agent, or Firm*—Birch, Stewart, Kolasch & Birch, LLP

(57) ABSTRACT

A pneumatic tire comprises a main body including a tread portion, a pair of sidewall portions, a pair of bead portions each having a bead core therein, a carcass extending between the bead portions through the sidewall portions and the tread portion, a light spot in the tire circumferential direction and an opposite spot of the light spot, and a noise damper made of a spongy material having a specific gravity in the range of from 0.005 to 0.060 and attached to an inner surface of the tread portion, the noise damper extending in the tire circumferential direction so as to form a gap part between ends thereof, and a center of the gap part is placed within an angle of 60 degrees from the opposite spot in the tire circumferential direction.

17 Claims, 8 Drawing Sheets

PRIOR ART

PNEUMATIC TIRE WITH NOISE DAMPER

BACKGROUND OF THE INVENTION

1. Field of the Invention

The present invention relates to a pneumatic tire with a noise damper for reducing a road noise, and more particularly to improve its uniformity.

2. Description of the Related Art

A road noise is known as one of tire noises. The road noise is a sound around from 50 to 400 Hz generated from a tire running on a road. A main cause of the road noise is resonance vibrations of air generated in the tire cavity. In recent years, there is proposed a pneumatic tire which comprises a main body c and a noise damper (a) made of spongy material and attached to the inner surface of the tread portion d of the main body c as shown in FIG. 10.

The noise damper is preferably pre-formed into an annular body and is inserted into the tire cavity to attach onto an inner surface thereof. However, since such a method requires preparing many kinds of noise dampers and molds to form them in accordance with each size of the tire, a productivity of the tire deteriorates remarkably.

Therefore, a noise damper having a non-annular body is proposed. The noise damper is made by bending a sheet-like sponge into an arc along the inner surface of the main body c. However, such a noise damper has a gap part causing a deterioration of a uniformity of the tire between ends thereof.

SUMMARY OF THE INVENTION

It is a main object of the present invention to provide a pneumatic tire in which the uniformity is improved.

According to the present invention, a pneumatic tire comprises
  a main body including a tread portion,
  a pair of sidewall portions,
  a pair of bead portions each having a bead core therein,
  a carcass extending between the bead portions through the sidewall portions and the tread portion,
  a light spot in the tire circumferential direction and
  an opposite spot separated from the light spot at an angle of 180 degrees in the tire circumferential direction, and
  a noise damper made of a spongy material having a specific gravity in the range of from 0.005 to 0.060 and attached to an inner surface of the tread portion of the main body,
  the noise damper extending in the tire circumferential direction so as to form a gap part between ends thereof, and
  a center of the gap part is placed within an angle of 60 degrees from the opposite spot in the tire circumferential direction.

BRIEF DESCRIPTION OF THE DRAWINGS

Embodiments of the present invention will now be described in detail in conjunction with the accompanying drawings.

DESCRIPTION OF THE PREFERRED EMBODIMENTS

Figure 1:
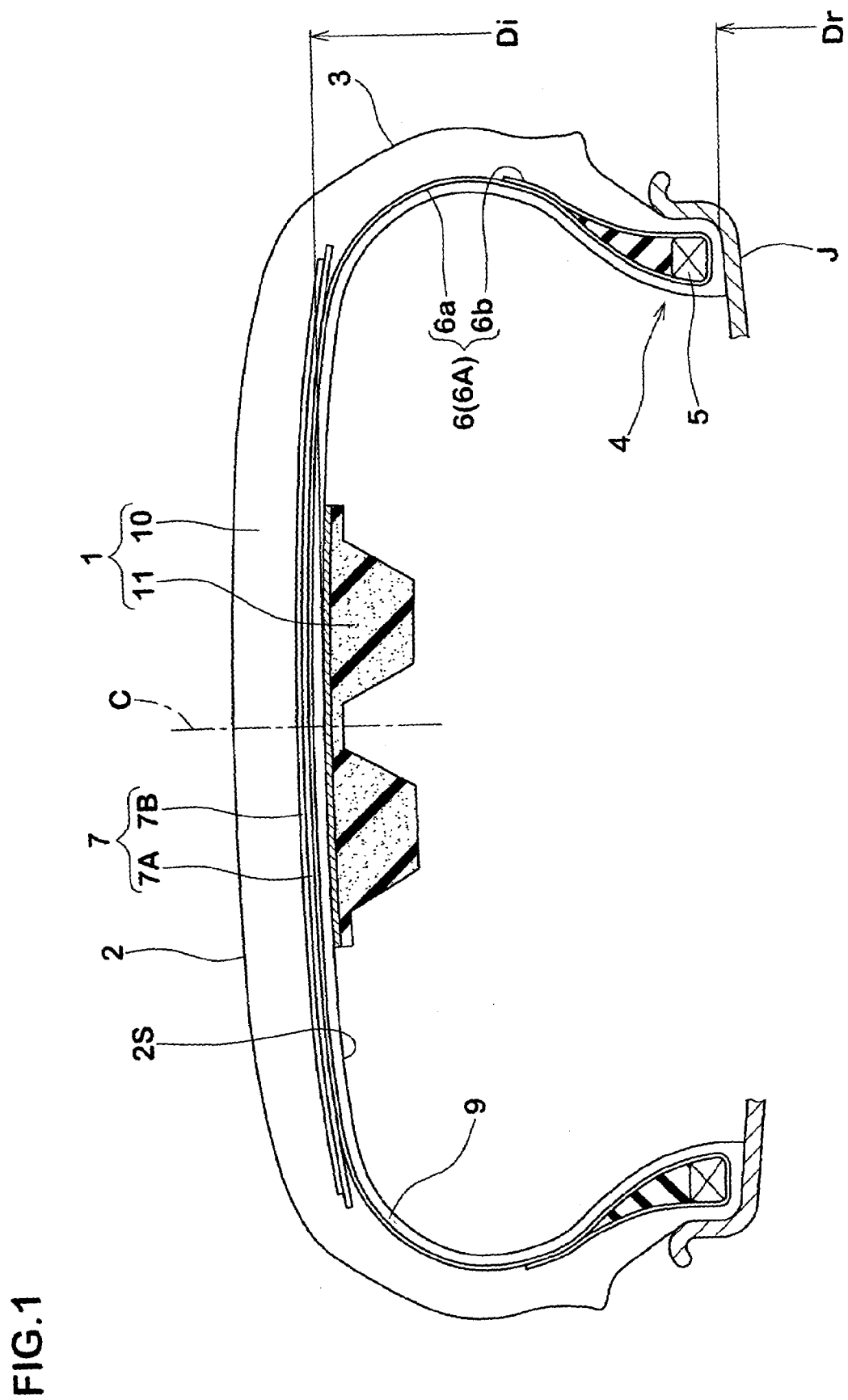
FIG. 1 is a cross sectional view showing an embodiment of a pneumatic tire in accordance with the present invention.

In the drawings, the pneumatic tire 1 according to the present invention is a tubeless type for passenger car. In FIG. 1, the tire 1 mounted on a rim J in accordance with present invention comprises a main body 10 and a noise damper 11 attached to the main body 10.

The main body 10 comprises: a tread portion 2; a pair of sidewall portions 3; a pair of bead portions 4 each with a bead core 5 therein; a carcass 6 extending between the bead portions 4; a belt 7 disposed radially outside the carcass 6 in the tread portion 2; an inner liner layer 9 made of a gas-impermeable rubber which is disposed along the inner side of the carcass 6; a light spot Q1 having the lightest weight in the tire circumferential direction; and an opposite spot Q2 separated from the light spot Q1 at an angle of 180 degrees in the tire circumferential direction.

The carcass 6 comprises at least one ply of cords inclined at angle of from 75 to 90 degrees with respect to the tire equator C. In this embodiment, the carcass 6 comprises one ply 6A. For the carcass cords, organic fiber cords, e.g. aromatic polyamide, polyester, rayon, nylon and the like can be suitably used. However, steel cords may be used.

The carcass ply 6A extends between the bead portions 4 and turned up around the bead core 5 in each bead portion 4 from the axially inside to the outside of the tire so as to form a pair of turnup portions 6b and a main portion 6a therebetween.

In this embodiment, the belt 7 comprises two cross belt plies 7A and 7B of parallel cords laid at an angle of from 10 to 40 degrees with respect to the tire equator C. For the belt cords, steel cords, and high modulus organic fiber cords such as aramid, rayon and like can be used.

In order to further improve the high-speed durability of the belt 7, a band which covers with the belt 7 and has cords with an angle of not more than 5 degrees with respect to the tire equator C can be disposed radially outside the belt 7 (not shown).

The noise damper 11 is made of a spongy material and is attached to an inner surface 2S of the tread portion 2 of the main body 10.

Here, the spongy material means not only a foamed elastomer or plastic of an open-cell or closed-cell type but also shaped intertangled fiber such as synthetic fiber, plant fiber and animal fiber.

For the spongy material, so-called elastomer sponge such as ether polyurethane sponge, ester polyurethane sponge and polyethylene sponge, and so-called rubber sponge such as chloroprene rubber (CR) sponge, ethylene propylene diene terpolymer (EPDM) rubber sponge, and nitrile-butadiene rubber (NBR) sponge can be used.

The spongy material has high vibration isolation ability and sound absorption ability, and efficiently absorbs vibration energy generated in a tire cavity surrounded by the main body 10 and the rim J. As a result, the resonance is suppressed, and road noise becomes small. The spongy material also can easily be shrunk, bent and deformed. Therefore, the noise damper 11 does not hinder the mounting operation of the main body 10.

In order to reduce the road noise effectively, it is desirable that the specific gravity of the spongy material is in the range of from 0.005 to 0.060. More preferably, it is not less than 0.010, and more preferably not less than 0.016, but preferably not more than 0.045, and further preferably not more than 0.035.

In order to reduce the road noise effectively and to keep a tire cost, the volume V2 of the noise damper 11 is preferably set in the range of from 0.4 to 20% of the volume V1 of the tire cavity.

In this specification, the expression "volume V2 of the noise damper" means the apparent entire volume of the noise damper 11 including inside bubbles. Further, the volume V1 of the tire cavity is defined under the normal inflated condition by the following approximate equation:

$$V1 = A \times \{(Di-Dr)/2 + Dr\}$$

wherein "A" is the cross sectional area of the tire cavity, "Di" is the maximum outer diameter of the tire cavity, and "Dr" is the rim diameter.

The above-mentioned normal inflated condition is such that the tire 1 is mounted on the rim J and inflated to a standard pressure but loaded with no tire load. The standard pressure is the "maximum air pressure" in JATMA, the "Inflation Pressure" in ETRTO, the maximum pressure given in the "Tire Load Limits at Various Cold Inflation Pressures" table in T&RA of the like. In case of passenger car tires, however, 200 kPa is used as the standard pressure.

Figure 3:
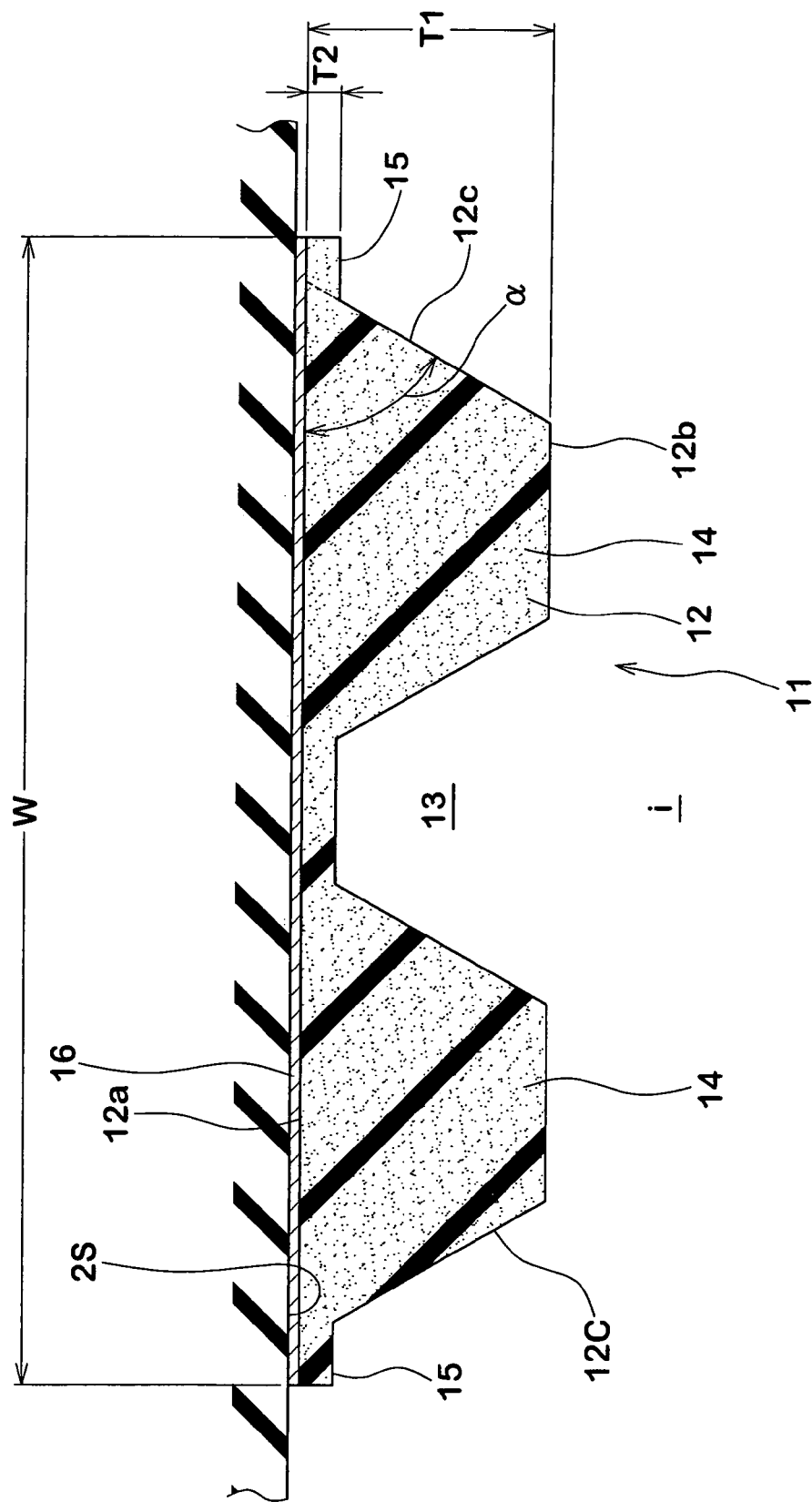
FIG. 3 is an enlarged cross sectional view of a noise damper.

The noise damper 11 extends, with substantially the same cross sectional shape, in a circumferential direction of the tire 1 on the tire equator C. A rectangular shape, a trapezoidal shape, a triangular shape, a bullet-like shape, a semi-circular shape and the like may be employed as the cross sectional shape of the noise damper 11. As shown in FIG. 3, the noise damper 11 of this present embodiment includes a base body 12 having substantially a trapezoidal cross section. The base body 12 includes bottom surfaces 12a fixed to an inner surface 2S of the tire, an upper surface 12b opposite from the bottom surface 12a, and side surfaces 12c on both sides of the tire in its axial direction.

Figure 4:
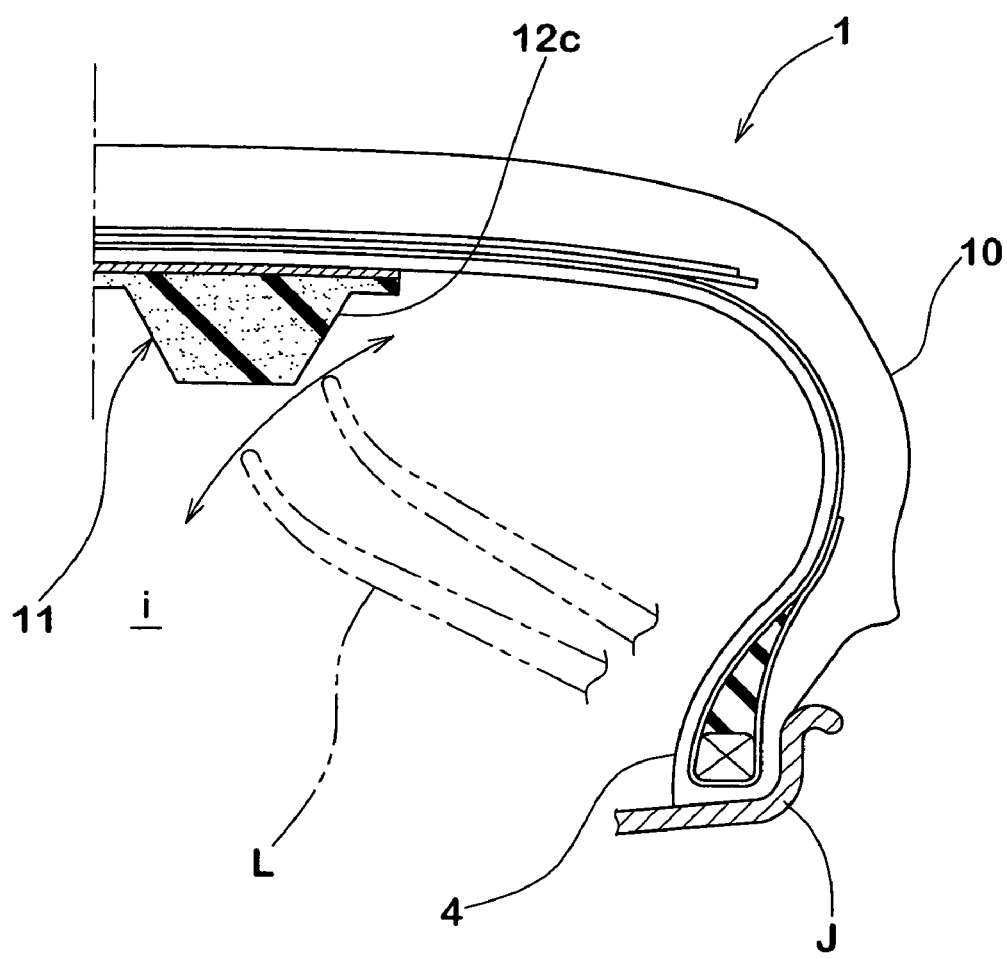
FIG. 4 is a cross sectional view explaining a relation between a tire lever and the noise damper.

Preferably, the base body 12 has a thickness T1 of from 10 to 45 mm. As shown in FIG. 3, it is preferable that a main portion of each side surface 12c is inclined in such a direction that a width W of the noise damper 11 in the tire axial direction is reduced toward the upper surface 12c from the bottom surface 12a thereof with this design, when the bead portion 4 of the main body 10 is detached from the rim J as shown in FIG. 4, a portion of the tire which is prone to interfere with a tip end of a tire lever J which inclines in the tire cavity i can be removed. Therefore, it is possible to effectively prevent the noise damper 11 from being damaged by contact with the tire lever L. Even if the noise damper 11 comes into contact with the tire lever J, since the side surface 12c inclines closely in the tangent direction of arc locus made by the tip end of the tire lever J, the tip end of the tire lever J does not easily bites the noise damper 11, and a friction force between the tire lever J and the side surface 12c can be reduced. Preferably, the angle alpha formed between the side surface 12c and the bottom surface 12a is in the range of from 30 to 75 degrees, and more preferably 30 to 70 degrees, and more preferably 30 to 60 degrees.

To enhance the adhesion between the noise damper 11 and the tire main body 10, the base body 12 includes a pair of blade portion 15 with a small thickness T2 and extending sideway along the bottom surfaces 12a. The thickness T2 of the blade portion 15 is not more than 75% of the thickness T1 of the base body 12, and preferably not more than 15 mm.

The upper surface 12b of the base body 12 is provided with a groove 13 extending circumferential direction of the tire at near a widthwise central portion of the base body 12. A cross sectional shape of the groove is preferably a U-shape or a V-shape, for example when the tire lever L comes into contact with the side surface 12c of the base body 12, the groove 13 facilitates deformation of mountain portions 14 divided by the groove 13, and release the noise damper 11 from the tire lever L with this groove 13, it is possible to further prevent the noise damper 11 from being damaged. Further, since the groove 13 increases the surface area of the noise damper 11, cavity resonance is further suppressed. Such an increase in the surface area further improves radiation effect of the noise damper 11, prevents the tire temperature from rising, and improves high speed endurance of the tire.

Various methods can be used for fixing the noise damper 11 to the main body 10. In terms of cost performance and operability, it is preferable to use adhesive or double-faced tape. In this embodiment, a double-faced tape 16 is used. Screws or other hardware may be also used, and it is also possible to integrally form the noise damper and the tire body by means of vulcanization.

To enhance the adhesion of the noise damper 11, it is preferable that a tread inner surface 2S of the tread portion 2 is finished as a smooth surface. Normally, the tread inner surface 2S has a projection by means of a vent groove of a bladder used in the process of vulcanization thereof. However, it is preferable that this is removed and smoothened by polishing. That process also can remove inside-paint (mold release agent) from the inner surface 2S of the tread portion. It is also possible to smoothen the tread inner surface 2S from the beginning if a smooth bladder having no air vent grooves on its surface is used.

Especially preferably, the main body 10 is vulcanized and formed without using the inside-paint on at least the tread inner surface 2S. With this, the adhesion between the tread inner surface 2S and the adhesive is further enhanced.

Figure 2:
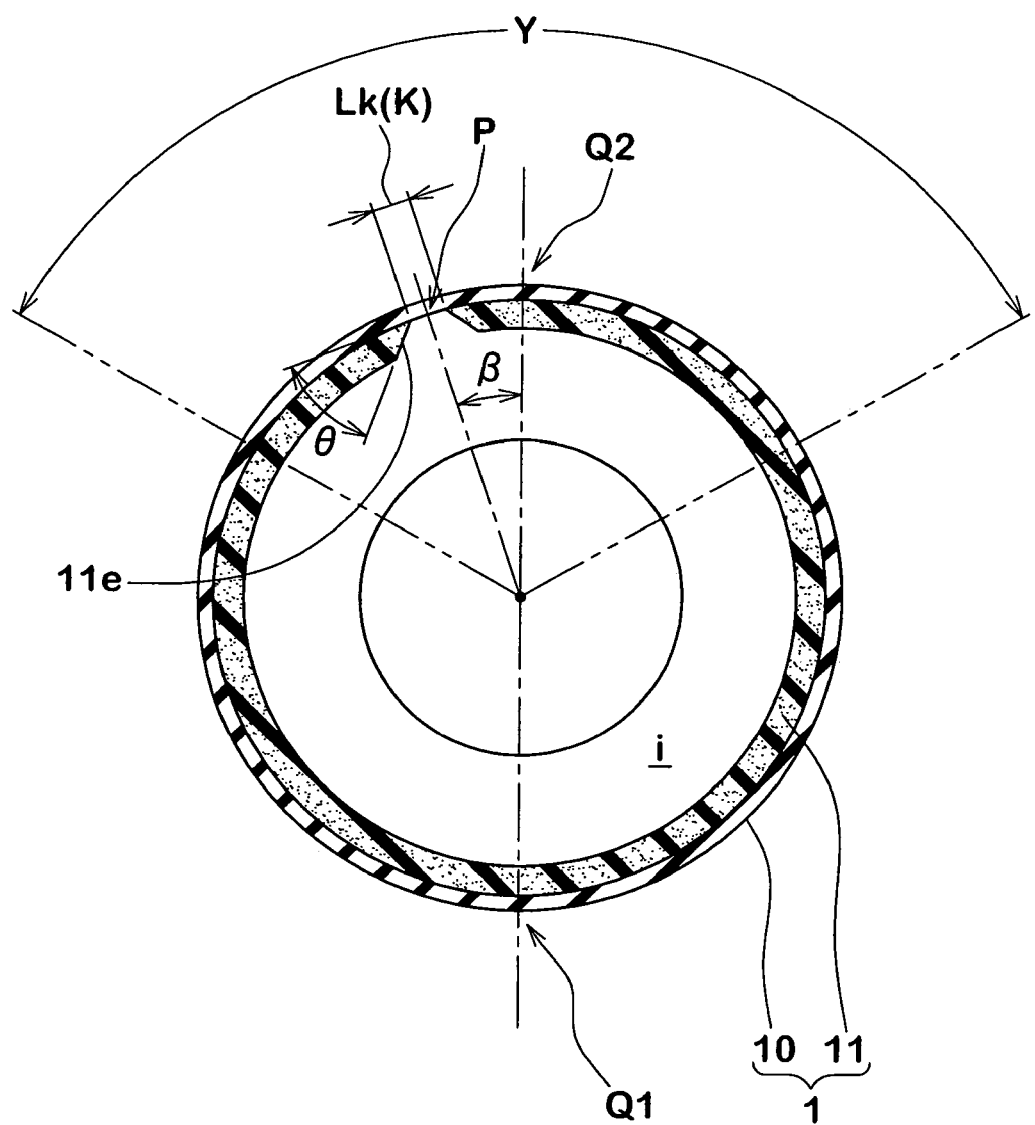
FIG. 2 is a circumferential sectional view of the tire.

As shown in FIG. 2, the noise damper 11 is a substantially straight rod-like spongy material which is bent along the tread inner surface 2S and attached thereto. With this, a gap part K between spaced ends 11e of the noise damper 11 is provided. The rod-like spongy material can be obtained by previously cutting a whole cloth into a predetermined length in accordance with a tire size. Thus, productivity and cost performance are excellent. In this embodiment, only one gap part K is provided. A tire (not shown) provided with a plurality of gap parts K using a plurality of spongy materials is included in the present invention.

Since the gap part K of the noise damper 11 has a length in the tire circumferential direction, it causes a weight unbalance and a deterioration of uniformity of the tire 1. Hence, to reduce the unbalance weight of the tire 1 in the circumferential direction, a center P of the gap part K is placed in a region Y within 60 degrees on both sides from the opposite point Q2 of the main body 10.

Here, the center P of the gap part K means a center of the circumferential length thereof. Also, the circumferential length of the gap part K means the shortest length Lk of the gap part K in the circumferential direction.

With this, the pneumatic tire 1 of this embodiment has small unbalance weight in the tire circumferential direction and uniformity of the tire is prevented from being deteriorated.

As shown in FIG. 2, each end 11e of the noise damper 11 is gradually reduced in thickness and extended in a tapered manner. The taper angle theta of the end 11e of the noise damper is preferably in the range of from 15 to 70 degrees, and more preferably from 30 to 60 degrees. Mass variation of the tapered end 11*e* of the noise damper 11 in the circumferential direction is small and thus, the unbalance weight can be reduced. Such end 11*e* reduces stress applied to the adhesive interface, and in turn, reduces peeling off and damage from the end 11*e*. Further, the end 11*e* reduces the length Lk of the gap part K toward the tread inner surface 2S.

Some Effects of the present invention will be described below. First, from ether-based polyurethane sponge (Product No.ESH2 made by Inoac Corp.) with specific gravity of 0.039, a spongy material having a cross section shape shown in FIG. 3 with following spec was prepared.

Height T1: 2 cm
Height T2: 0.5 cm
Cross section width W in bottom surface: 9.7 cm
Area S of cross section: 12.13 cm$^2$
Taper angle θ of end: 45 degrees Next, this spongy material was pasted on the tread inner surface 2S of the radial tire body for a passenger vehicle with a size (215/45R17) by using a double-faced tape (product No. 5000NS produced by Nitto Denko Corp.) along the circumferential direction.

With this, a tire 1 having a noise damper was produced, and the shortest length Lk of the gap part K in the circumferential direction was 10 cm.

The unbalance weight Ma of the gap part K was 7.1 g. Assuming that the noise damper 11 is an annular body which continuously extends, with the same cross section shape, in the circumferential direction of the tire, this unbalance weight is defined as virtual weight taken away from the annular body.

A plurality of tires 1 were produced such that the angle beta between the center P of the gap part and the opposite point Q2 of the main body 10 is varied every 10 degree in a range of from 0 to 90 degree.

Further, uniformity of each tire was measured using a uniformity machine. The measured uniformities were as follows.

Figure 5:
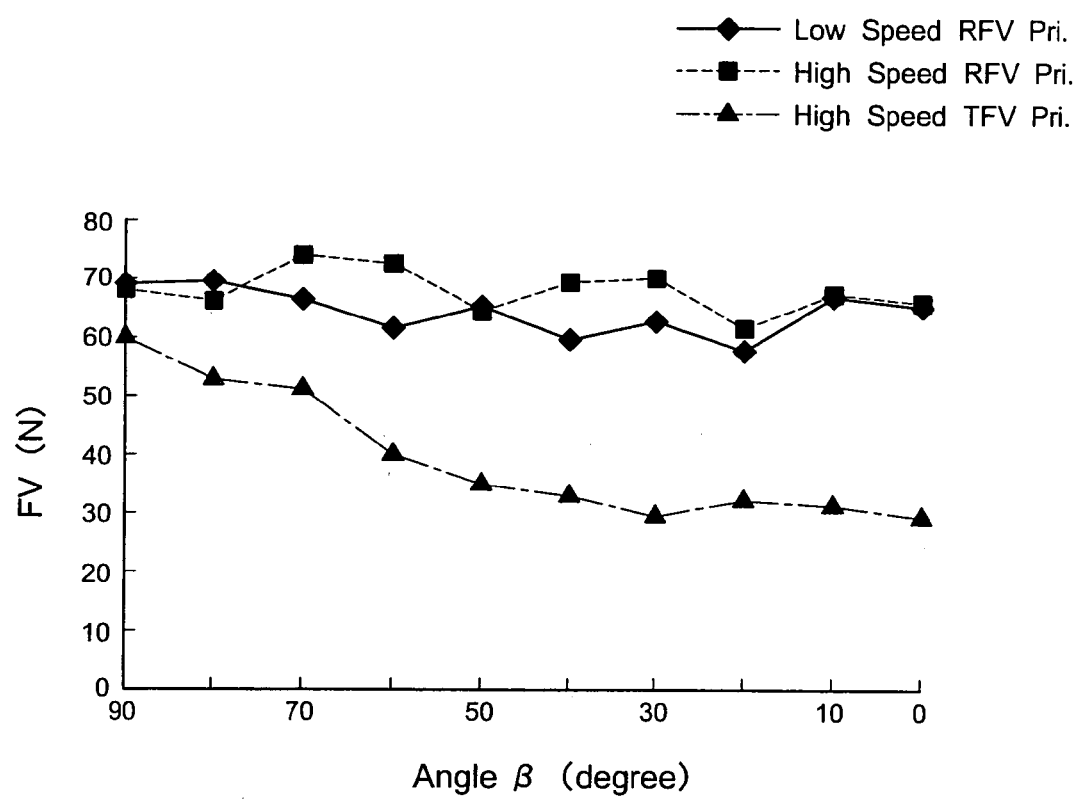
FIG. 5 is a graph showing a relation between a position of a gap part of the noise damper and an uniformity of the tire.

Low speed RFV primary: primary radial force variation at speed of 20 km/h
High speed RFV primary: primary radial force variation at speed of 120 km/h
High speed TFV primary: primary tangential force variation at speed of 120 km/h A relation between the angle beta and uniformity is shown in FIG. 5. As shown in FIG. 5, even if the angle beta varied in a range of 0 to 90 degrees, the low speed RFV primary and the high speed RFV primary did not vary almost at all. However, it was confirmed that although the high speed TFV primary did not vary almost at all when the angle beta varied in a range of 0 to 60 degrees, the high speed TFV primary abruptly increased when the angle beta exceeded 60 degrees. Thus, it was confirmed that the angle beta between the center P of the gap part K and the opposite spot Q2 of the main body is preferably set in the range of from 0 to 60 degrees in order to improve the uniformity of the tire. The angle beta is further preferably set in a range of from 0 to 50 degrees, and more preferably from 0 to 30 degrees.

Figure 6:
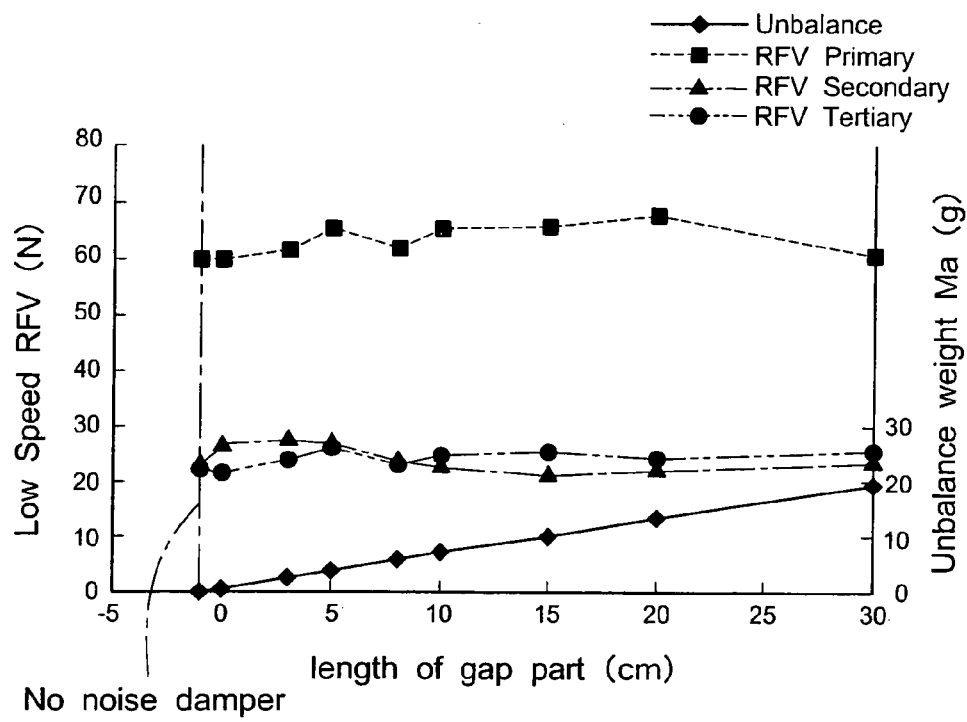
FIGS. 6 to 9 are graphs showing a relation between a length of the gap part and the uniformity of the tire.
Figure 7:
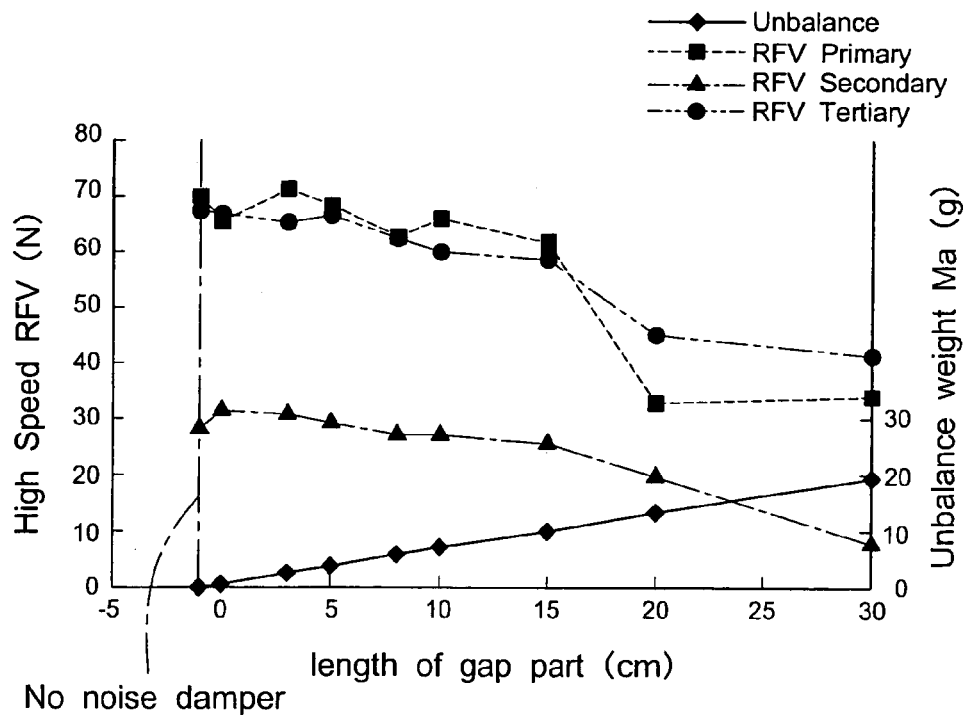
Figure 8:
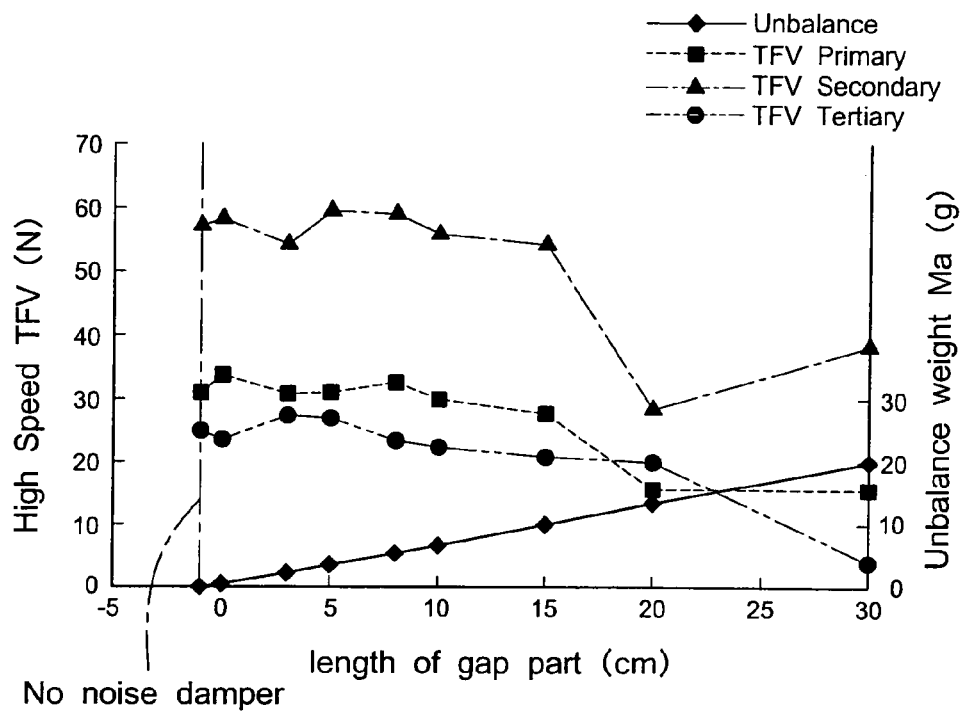

FIGS. 6 to 8 shows a relation between the length Lk of the gap part K, the unbalance weight Ma of the gap part K, and the uniformity, when the angle beta of was fixed. Here, primary to tertiary components of each of the low speed RFV, the high speed RFV and the high speed TFV were measured as the uniformity.

When the length Lk is up to 15 cm (Ma=10.3 g), primary to tertiary components of each of the low speed RFV, the high speed RFV and the high speed TFV did vary almost at all. The road noise reduction effect was also at a sufficient level.

However, it was confirmed that if the length Lk of the gap part K exceeded 20 cm (Ma=13.5 g), each force variation became small. This means that if the unbalance weight Ma of the noise damper 11 increases, unbalance weight of the tire main body 10 improves.

Figure 9:
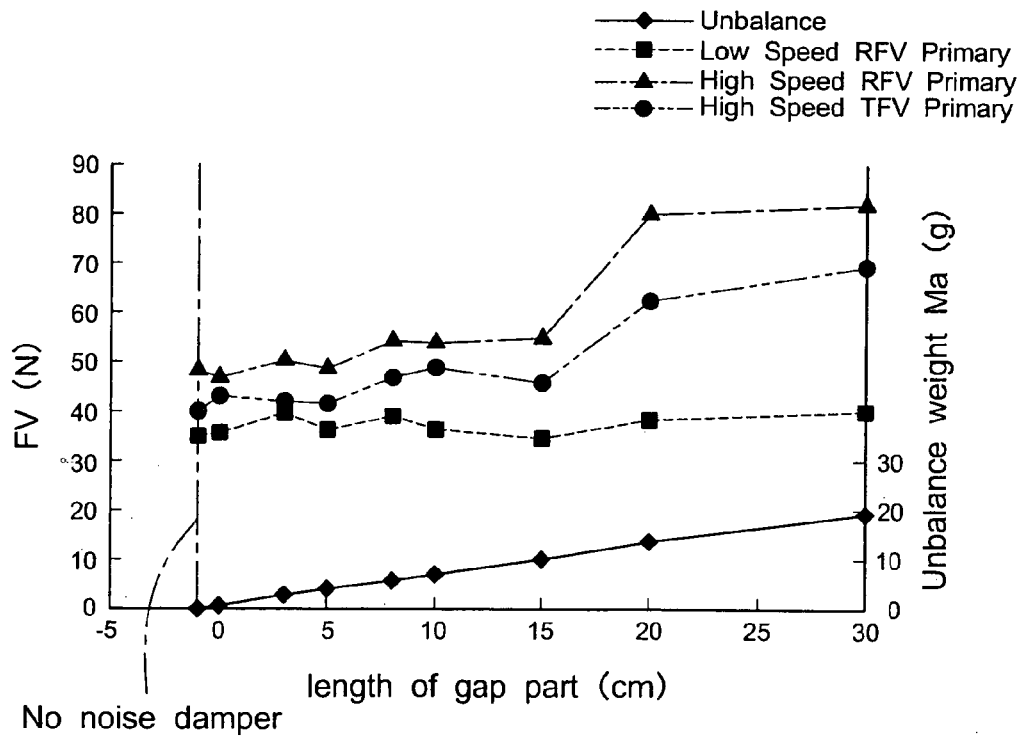
Figure 10:
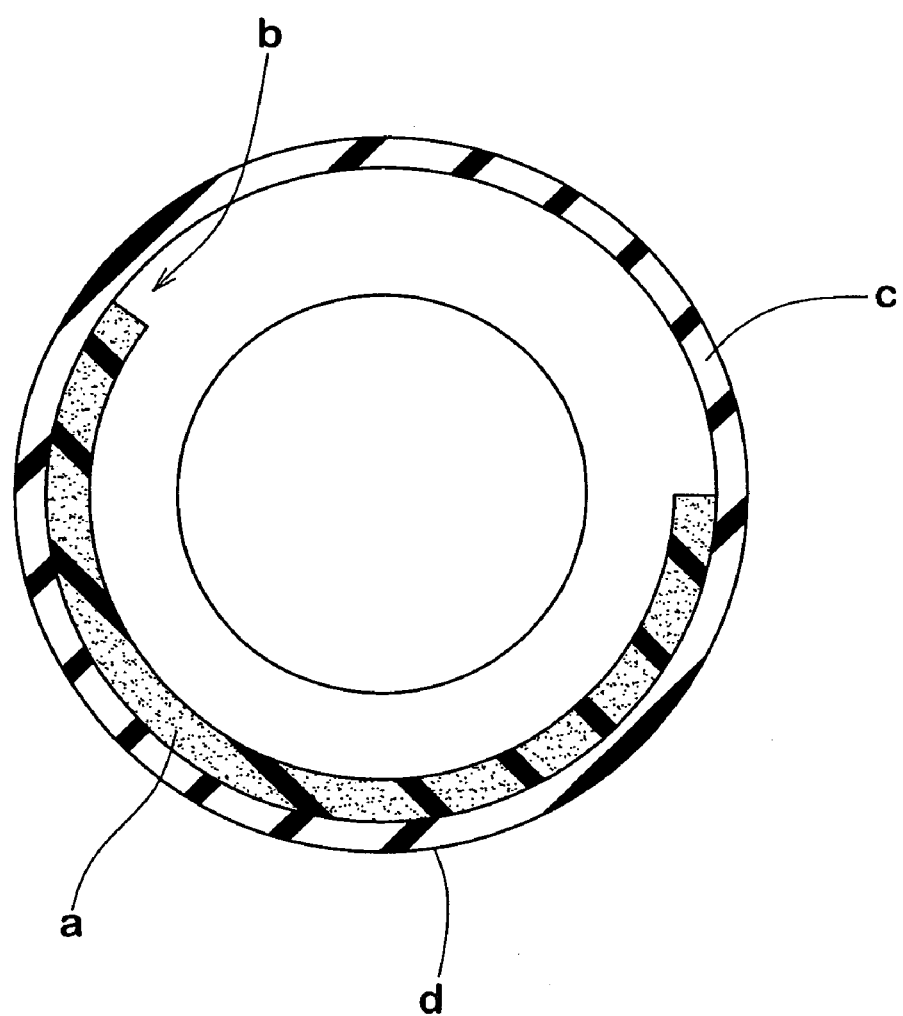
FIG. 10 is a circumferential sectional view of the conventional pneumatic tire.

FIG. 9 shows a relation between the uniformity and the length Lk of the gap part when the unbalance weight of the main body is smaller than that of the previous example. In this case, if the unbalance weight Ma of the gap part is increased, this is applied to the main body 10 reversely, and each force variation is deteriorated. Therefore, in order to enhance the uniformity with respect to all of the tire main bodies 10, it is preferable that the unbalance weight Ma of the noise damper 11 is not more than 10.3 g.

To maintain the outward appearance of the tire 1, it is preferable that the length Lk of the gap part K is not more than 8.0 cm.

Further, it is preferable that the noise damper 11 is made water-repellent for preventing the same from absorbing water. It is possible to make the spongy material water-repellent by previously mixing a water repellent in the spongy material. AS the water repellent, for example, it is preferable to use ester that is a combination of mono-alcohol and one of aliphatic dicarboxylic acid and alicyclic dicarboxylic acid.

The invention claimed is:

1. A pneumatic tire comprising a main body including:
   a tread portion,
   a pair of sidewall portions,
   a pair of bead portions each having a bead core therein,
   a carcass extending between the bead portions through the sidewall portions and the tread portion,
   a light spot in the tire circumferential direction and
   an opposite spot separated from the light spot at an angle of 180 degrees in the tire circumferential direction, and
   a noise damper made of a spongy material having a specific gravity in the range of from 0.005 to 0.060 and attached to an inner surface of the tread portion of the main body,
   the noise damper extending in the tire circumferential direction so as to form a gap part between ends thereof,
   a center of the gap part being placed within an angle of 60 degrees from the opposite spot
   in the tire circumferential direction, and
   at least one end of the noise damper tapering with a taper angle of from 15 to 70 degrees so that a length of the gap part in the tire circumferential direction is gradually decreased toward the inner surface of the tread portion of the main body.

2. The pneumatic tire according to claim 1, wherein the circumferential center of the gap part is placed within an angle of 50 degrees from the opposite spot in the tire circumferential direction.

3. The pneumatic tire according to claim 1, wherein the circumferential center of the gap part is placed within an angle of 30 degrees from the opposite spot in the tire circumferential direction.

4. The pneumatic tire according to claim 3, wherein both ends of the noise damper taper with the taper angle of from 15 to 70 degrees.

5. The pneumatic tire according to claim 1, wherein the circumferential center of the gap part is substantially placed at the opposite spot in the tire circumferential direction.

6. The pneumatic tire according to claim 1, wherein the gap part has an unbalanced weight of not more than 10.3 g, wherein
   the unbalanced weight is defined as a virtual weight taken away from the noise damper which has an annular body.

7. The pneumatic tire according to claim 1, wherein the noise damper has one gap part.

8. The pneumatic tire according to claim 1, wherein the noise damper has water-repellency.

9. The pneumatic tire according to claim 1, wherein a shortest length of the gap part in the tire circumferential direction is not more than 8.0 cm.

10. The pneumatic tire according to claim 1, wherein
the noise damper includes a base body formed in a substantially trapezoidal cross section,
the base body includes
a bottom surfaces fixed to an inner surface of the tread portion,
an upper surface being opposite from the bottom surface and
a pair of side surfaces on both sides of the axial direction of the tire,
the base body has a thickness of from 10 to 45 mm, and
a width of the noise damper in the tire axial direction is greater than the thickness of the base body.

11. The pneumatic tire according to claim 10, wherein
each side surface is inclined in such a direction that the width of the noise damper is reduced toward the upper surface from the bottom surface, and
an angle formed between the side surface and the bottom surface is in the range of from 30 to 75 degrees.

12. The pneumatic tire according to claim 11, wherein the angle formed between the side surface and the bottom surface is in the range of from 30 to 60 degrees.

13. The pneumatic tire according to claim 11, wherein the upper surface of the base body is provided with a groove extending circumferential direction of the tire.

14. The pneumatic tire according to claim 13, wherein the width of the groove gradually decreases toward its bottom.

15. The pneumatic tire according to claim 10, wherein
the noise damper comprises the base body and a pair of blade portions with a small thickness each extending sideway along the bottom surfaces at the both sides of the base body, and
a thickness of each blade portion is not more than 75% the thickness of the base body and not more than 15 mm.

16. The pneumatic tire according to claim 15, wherein
the upper surface of the base body is provided with a groove extending circumferential direction of the tire.

17. The pneumatic tire according to claim 16, wherein the width of the groove gradually decreases toward its bottom.

* * * * *